(12) United States Patent
Mizrahi (10) Patent No.: US 8,599,858 B1
(45) Date of Patent: Dec. 3, 2013

(54) SYSTEM AND METHOD FOR KEEP ALIVE MESSAGE AGING

(75) Inventor: Tal Mizrahi, Haifa (IL)

(73) Assignee: Marvell Israel (M.I.S.L.) Ltd., Yokneam (IL)

(*) Notice: Subject to any disclaimer, the term of this patent is extended or adjusted under 35 U.S.C. 154(b) by 566 days.

(21) Appl. No.: 12/785,936

(22) Filed: May 24, 2010

Related U.S. Application Data (60) Provisional application No. 61/233,438, filed on Aug. 12, 2009.

(51) Int. Cl.
*H04L 12/28* (2006.01)

(52) U.S. Cl.
USPC ................................... 370/395.31

(58) Field of Classification Search
USPC ......... 370/395.31, 352, 395.3, 255, 389, 225; 709/227; 714/43
See application file for complete search history.

(56) References Cited

U.S. PATENT DOCUMENTS

| | | | | |
|---|---|---|---|---|
| 6,614,785 | B1* | 9/2003 | Huai et al. | 370/352 |
| 7,194,661 | B1* | 3/2007 | Payson | 714/43 |
| 7,720,061 | B1* | 5/2010 | Krishnaswamy et al. | 370/389 |
| 7,788,381 | B2* | 8/2010 | Watson et al. | 709/227 |
| 2006/0002292 | A1* | 1/2006 | Chang et al. | 370/225 |
| 2009/0185566 | A1* | 7/2009 | Ogasahara et al. | 370/395.3 |
| 2010/0165883 | A1* | 7/2010 | Holness et al. | 370/255 |

OTHER PUBLICATIONS

The Institute of Electrical and Electronics Engineers, Inc. (IEEE); Virtual Bridged Local Area Networks—Amendment 5: Connectivity Fault Management, IEEE P802.1ag/D8.1, Jun. 18, 2007.
International Telecommunication Union (ITU-T); Series Y: Global Information Infrastructure, Internet Protocol Aspects and Next Generation Networks, Y.1711, Feb. 2004.
Internet Engineering Task Force (IETF), Bidirectional Forwarding Detection, D. Katz and D. Ward, Feb. 5, 2009.
Internet Engineering Task Force (IETF), BFD for MPLS LSPs, R. Aggarwal et al., Jun. 20, 2008.
Internet Engineering Task Force (IETF), BFD for IPv4 and IPv6 (Single Hop), D. Katz and D. Ward, Feb. 5, 2009.

(Continued)

*Primary Examiner* — Dang Ton
*Assistant Examiner* — Lionel Preval (57) ABSTRACT

A packet processor is described that performs keep alive message processing using a bifurcated aging table approach. The packet processor includes an aging table, a binding module and an aging daemon. The aging table includes a plurality of records corresponding to a plurality of network links supported by the packet processor. Each record in the aging table is used to track an aging status of a corresponding network link. The binding module associates a received message with a record in the aging table based on information in the received message. The aging daemon scans the aging table, updates the aging status of each network link, and determines that a network link has failed when the updated status for the respective network link exceeds a predetermined threshold. In an embodiment, the aging table includes a base aging table that uses a first number of bits to track the aging status of each network link and an extended aging table that uses a second number of bits that is larger than the first number of bits to track an aging status of a network link on which a number of not received keep alive messages exceeds a threshold.

20 Claims, 7 Drawing Sheets

(56) References Cited

OTHER PUBLICATIONS

Internet Engineering Task Force (IETF), Bidirectional Forwarding Detection (BFD) for the Pseudowire Virtual Circuit Connectivity Verification (VCCV), T. Nadeu and C. Pignataro, Jul. 27, 2009.

Internet Engineering Task Force (IETF), Operations and Management (OAM) Requirements for Multi-Protocol Label Switched (MPLS) Networks, T. Nadeau et al., Feb. 2006.

Internet Engineering Task Force (IETF), Pseudo Wire Virtual Circuit Connectivity Verification (VCCV), T. Nadeau et al., Jan. 2007.

* cited by examiner

FIG. 1

AGING TABLE

| VALID | AGING PERIOD INDEX | AGE STATE | |
|---|---|---|---|
| | | | ~200 |
| | | | |
| | | | |
| ⋮ | ⋮ | ⋮ | |
| | | | |
| | | | |
| | | | |
| 1 BIT | 3 BITS | $LOG_2 n+1$ | |

Rows labeled 0, 1, ⋮

SYSTEM AND METHOD FOR KEEP ALIVE MESSAGE AGING

INCORPORATION BY REFERENCE

This application claims the benefit of U.S. Provisional Application No. 61/233,438, "SYSTEM AND METHOD FOR KEEP ALIVE MESSAGE AGING," filed by Tal Mizrahi on Aug. 12, 2009, which is incorporated herein by reference in its entirety.

BACKGROUND

Keep-alive messages are used by networking equipment to rapidly detect communication failures, or link failures, between communicating devices. Such rapid detection allows, for example, new, alternate communication paths to be established so that information flows between devices and/or across one or more networks are not adversely affected.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

In accordance with embodiments of the disclosure, a packet processor is described that tracks the status of links supported by the packet processor by monitoring and tracking the receipt of keep alive messages associated with the respective links. Example embodiments of the described packet processor use a bifurcated aging table to perform such keep alive message processing. In one such embodiment, a first table, or base aging table, with reduced storage requirements is used to hold data common to all monitored links, while a second table, or extended aging table, is used to hold additional data for only those links that are experiencing connection difficulties. In other example embodiments, one or more of the base aging table and the extended aging table are implemented in binary content-addressable memory (CAM), or ternary content-addressable memory (TCAM), based tables. The described approach reduces memory requirements and allows keep alive message processing to be performed at network transmission speeds. The approach is scalable with respect to the number of links that can be managed and is sufficiently robust to handle bursts of high volume traffic.

In one example embodiment, a packet processor includes an aging table, a binding module and an aging daemon. The aging table includes a plurality of records corresponding to a plurality of network links supported by the packet processor. Each record in the aging table is used to track an aging status of a corresponding network link. The binding module associates a received message with a record in the aging table based on information in the received message. The aging daemon scans the aging table, updates the aging status of each network link, and determines that a network link has failed when the updated status for the respective network link exceeds a predetermined threshold.

In a second example embodiment, a method performed by a packet processor of a network enabled device to monitor a status of a network link between the network enabled device and one of a plurality of external devices is described. The method includes receiving a keep alive message from one of the plurality of external devices, identifying a network link on which the keep alive message was received by matching an identifier in the keep alive message with a record for the network link in a binding table, and clearing an aging count in a record for the network link in an aging table upon receiving the keep alive message associated with the network link.

In a third example embodiment, a network enabled device that includes the packet processor of the first example embodiment is described.

In example embodiments of the packet processor and in example embodiments of the network enabled device, additional features may be included. In an example, the binding module associates a keep alive message received on a network link with a record in the aging table corresponding to the network link. Further, the aging table is configured to record a count corresponding to a number of consecutive keep alive messages that are not received on a network link as the aging status of the network link. Then, the aging daemon is configured to increase the count in response to not receiving another keep alive message, and reset the count to zero when a keep alive measure is received.

In an embodiment, the aging table includes a base aging table that uses a first number of bits to track the aging status of each network link, and an extended aging table that uses a second number of bits that is larger than the first number of bits to track an aging status of a network link on which a number of not received keep alive messages exceeds a threshold.

The packet processor further includes an aging period table configured to store a plurality of allowable time intervals of two consecutive keep alive messages. The binding module includes at least one of a CAM table and a TCAM table that determine the record in the aging table based on the information in the received message.

In example embodiments of the method of monitoring a status of a network link between the network enabled device and one of the plurality of external devices, additional features may be included. For example, the method can further include incrementing the aging count upon failing to receive a keep alive message associated with the network link in a predetermined aging interval, determining that the network link has failed if the incremented aging count exceeds a predetermined aging threshold, assigning the predetermined aging interval to the network link from an aging period table that defines a plurality of predetermined aging intervals, and determining that the predetermined aging interval has expired upon determining that a number of clock cycles defined by the predetermined aging interval have transpired. Incrementing the aging count can further include, scanning the aging table after expiration of each predetermined aging interval, and incrementing the aging count for each network link associated with the expired aging interval. In embodiments in which the aging table is bifurcated into a base aging table and an extended aging table, the method can further include, maintaining a record in the base aging table for each network link, creating a record in the extended aging table for each network link in the base aging table that has failed to receive keep alive messages during two or more sequential predetermined aging intervals, and maintaining an index value in a record in the base aging table for a corresponding record in the extended aging table.

BRIEF DESCRIPTION OF THE DRAWINGS

Example embodiments of a packet processor that performs keep alive message processing, and methods of performing keep alive message processing in a packet processor will be described with reference to the following drawings, wherein like numerals designate like elements, and wherein.

DETAILED DESCRIPTION OF EMBODIMENTS

Figure 1:
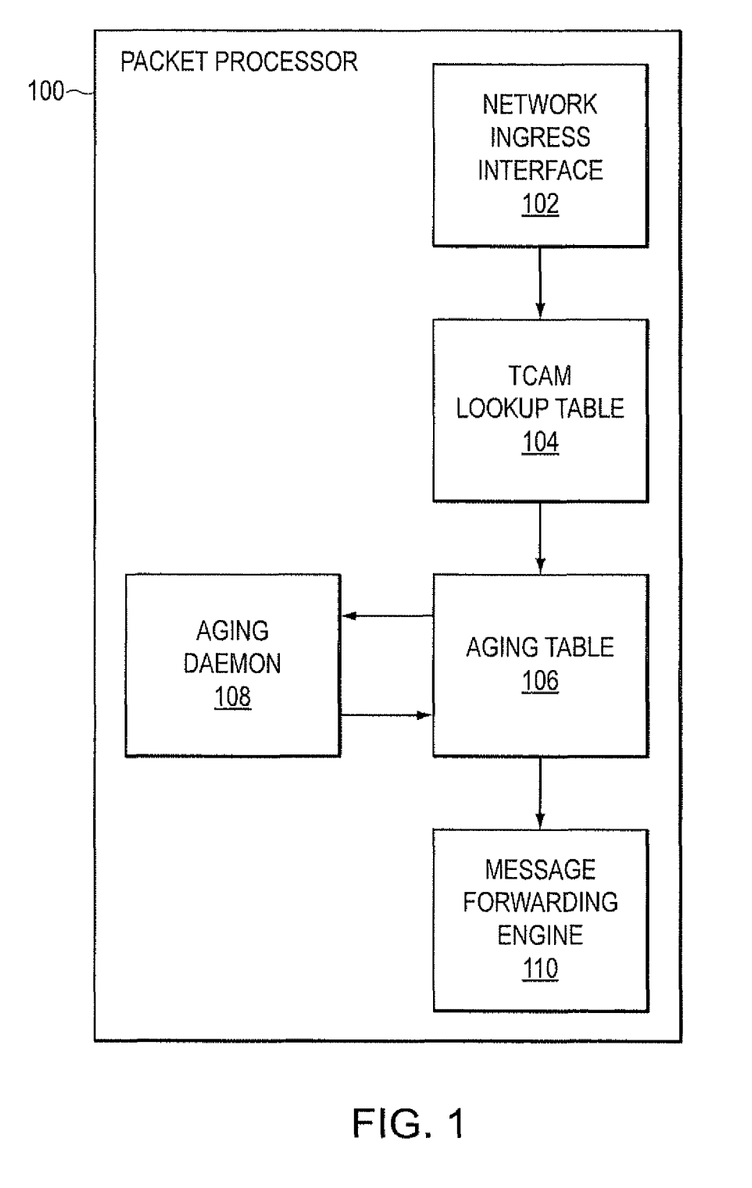
FIG. 1 is a simplified block diagram of an example packet processor that performs keep alive message processing.

FIG. 1 is a simplified block diagram of an example packet processor 100 that performs keep alive message processing and that is suitable for inclusion in a network enabled device. Examples of such a network enabled device include network infrastructure devices, such as network switches, network access points, network bridges, network routers, etc., and/or any network enabled end-user devices, such as network enabled desktop computers, laptop computers, hand-held computers, personal digital assistants, cell phones, internet protocol (IP) phones, mobile global positioning system receivers and/or any other stationary or mobile network enabled devices.

In one embodiment, the described packet processor is implemented as an application specific integrated circuit (ASIC) that is included in a network enabled device and that communicates with a central processing unit (CPU) of the network enabled device via an internal interface. In another example embodiment, the described packet processor is implemented using hardware components included in a system-on-a-chip (SOC) integrated circuit. In such an embodiment, the SOC may include a CPU for the network enabled device and integrated circuit components that communicate directly with the CPU, as well as a second processor unit, or packet processor, separate from the CPU, that provides the CPU with a network packet interface and that includes additional integrated circuit hardware components, described in greater detail below. In an embodiment, the packet processor supports keep alive message processing as described herein, in addition to typical packet routing and forwarding services provided by a packet processor.

As seen in FIG. 1, one example embodiment of packet processor 100 includes a network ingress interface 102, a ternary content-addressable memory (TCAM) based lookup table 104, an aging table 106, an aging daemon 108 and a message forwarding engine 110. In the example embodiments described below, one or more of the tasks described as being performed by network ingress interface 102, aging daemon 108 and/or message forwarding engine 110 may be performed by the packet processor operating under the control of executable instructions loaded from static or non-volatile memory, e.g. read only memory (ROM), or flash memory. Further, as described below, TCAM lookup table 104 and aging table 106 may be implemented in random access memory (RAM) and/or CAM memory, that is accessible to the packet processor operating under the control of such executable instructions.

Network ingress interface 102 provides packet processor 100 with network access to external devices with which network links have been established. For example, in one example embodiment, network ingress interface 102 processes a message received via a physical network interface to extract embedded message header information and/or message data. Network ingress interface 102 parses the extracted message header information and/or message data to obtain a unique identifier of the network device from which the message originated, such as a media access control (MAC) source address, a local area network (LAN) identifier (LAN ID), or a virtual LAN identifier (VLAN ID). Network ingress interface 102 then uses the retrieved source identifier as a search field to search TCAM lookup table 104 to retrieve an aging table index that ties the link on which the message was received to a link entry in aging table 106 that is used to track the age state of the link, as described in greater detail below.

Ternary content addressable memory (TCAM) lookup table 104 provides a fast, flexible, i.e., maskable, hardware-based lookup table that associates, or binds, a source identifier retrieved from a received message with an index for a link entry in aging table 106. TCAM lookup table 104 allows rapid searches to be performed in which one or more of the bits in the retrieved source identifier are masked using a third matching state of "X" or "Don't Care." In this manner, TCAM lookup table 104 is able to rapidly bind a received keep alive message to a link entry in aging table 106 that is used to track the age state of the link. Note that in embodiments in which the ability to perform masked searches is not required, TCAM lookup table 104 may be implemented as a binary CAM based table. TCAM lookup table 104, whether implemented in TCAM or CAM may be referred to as a binding table because it is used to rapidly bind a received keep alive message to a link entry in aging table 106 that is used to track the age state of the link.

Aging table 106 is used by packet processor 100 to track the status of each link established between the network enabled device in which packet processor 100 is included and external network enabled devices. In one example embodiment, described below with respect to FIG. 2, aging table 106 is implemented as a single table in random access memory. In another example embodiment, described below with respect to FIG. 3, aging table 106 is bifurcated and implemented as two separate but related tables. In such an embodiment, a first table, or base aging table, with reduced storage requirements is used to hold data common to all monitored links, while a second table, or extended aging table, is used to hold additional data for only those links that are experiencing connection difficulties. In both embodiments, aging table 106 maintains an age state for each monitored link that is updated by aging daemon 108, as described in greater detail below.

Aging daemon 108, monitors a set of aging period counters maintained for various selected network links, as described below with respect to FIG. 4 and FIG. 5, and performs a read-modify-write (RMW) aging process each time a period counter expires, as describe below with respect to FIG. 6, that updates the aging table entries to reflect the incremented age state of the respective links. If the incremented age state of a link exceeds a predetermined threshold, as described in greater detail below, aging daemon 108 marks the link as having aged out, and notifies the network enabled device CPU that the link has failed, as described in greater detail below. Further, aging demon monitors the receipt of keep alive messages by packet processor 100 and resets the age state associated with a link each time a keep alive message is received on the link.

Message forwarding engine 110 receives messages from network ingress interface 102 and upon receiving an indication from aging daemon 108, as described in greater detail below with respect to FIG. 7, that the message is not a keep alive message, forwards the message to the CPU of the network enabled device for further processing and/or transmission to a next network destination.

Figure 2:
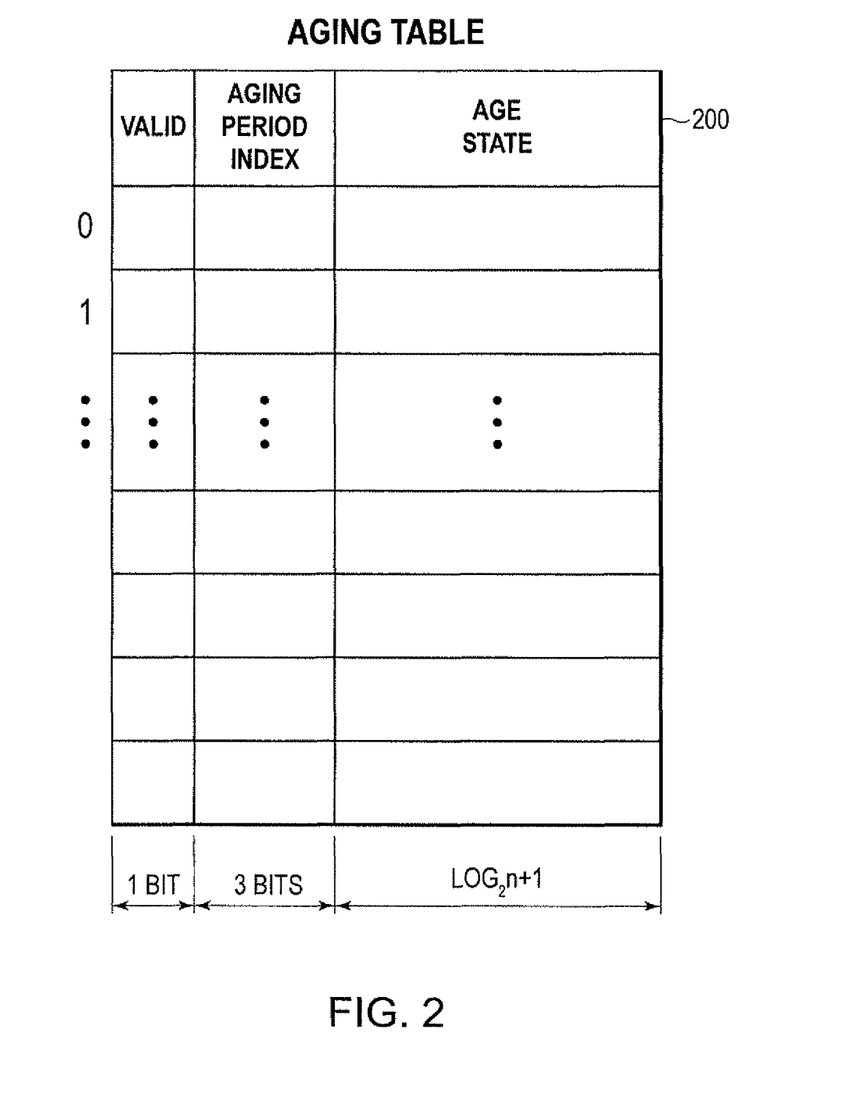
FIG. 2 is a data structure diagram of a non-bifurcated aging table structure that supports a described embodiment of the method of performing keep alive message processing in a packet processor.

FIG. 2 is a data structure diagram of an example non-bifurcated embodiment of aging table 106 that supports a described embodiment of the method of performing keep alive message processing in packet processor 100. As seen in FIG. 2, in an embodiment, non-bifurcated aging table 200 includes a 1-bit "valid" field, a 3-bit "aging period index" field and an "age state" field of length $\log_2 n+1$, where n is a maximum number of keep alive messages, in an embodiment consecutive keep alive messages, that any link is allowed to miss before the link is determined to have failed. As further seen in FIG. 2, each entry in aging table 200 is associated with a numeric index that corresponds to the sequential order of the respective entry in the table.

The 1-bit "valid" field seen in FIG. 2, is used to indicate whether the entry is in active use, i.e., is valid, or available for re-use, i.e., invalid, and thereby provides an efficient manner of invalidating an entire entry in aging table 200 by changing a single bit. In one example embodiment, the valid bit is set to 1 if the entry is currently in use, and cleared if there is no flow, or link, bound to the entry.

The 3-bit "aging period index" is an index to an aging period table, described in greater detail below with respect to FIG. 4, which determines the aging period of a link, i.e., the period between arrivals of keep alive messages on the link. In an embodiment in which the aging period index is 3-bits, the aging period table can include up to 8 different age periods that can be assigned to one or more links based on the requirements of the respective links. Each link entry in the aging table is configured with an aging period by assigning an aging period index that corresponds to an aging period in the aging period table. Each aging period index points to an entry in the aging period table that stores a count of clock cycles associated with a defined keep alive period, i.e., a period between arrivals of keep alive messages on a link. For example, assuming that the processor clock frequency of a packet processor is 20 MHz, a 40-bit aging period allows a keep alive period to be defined that may be up to 17 minutes long.

Associated with each aging period defined in the aging period table is an age-out threshold that is $\log_2 n+1$ bits long, where n is a maximum number of keep alive messages, in an embodiment consecutive keep alive messages, that any link is allowed to miss before the link is determined to have failed. The age-out threshold indicates a number of keep alive messages that a link is allowed to miss before the link is determined to have failed. In one example embodiment, the age-out threshold is a global value that is applied to all links. In such an embodiment the duration of a link failure period is the length of the selected aging period assigned to the link times the global age-out threshold. In another embodiment, a table similar to the aging period table could be provided that allows a link to be assigned one of a predetermined number of age-out thresholds based on an age-out threshold index included in each entry in the aging table, thereby increasing memory storage requirements, but providing additional flexibility with respect to the available durations of the link failure periods that may be associated with different links. In yet another embodiment, the aging table may be modified to allow an age-out threshold to be assigned to each entry in the aging table, thereby further increasing memory storage requirements, but providing further flexibility with respect to the available durations of the link failure periods that may be associated with different links.

As further seen in FIG. 2, the example non-bifurcated aging table 200 also includes an "age state" with a length that is $\log_2 n+1$ bits, i.e., the same length as the largest age-out threshold that maybe assigned to the link. The age state maintains a count of the keep alive messages that the link has missed without the counter having been reset to zero. As described in greater detail below with respect to FIG. 4 through FIG. 6, each time an aging period expires, the aging daemon parses through the aging table and increments the age state of links associated with the expired aging period. As described below with respect to FIG. 7, each time a keep alive message is received on a link, the age state is reset to zero. Therefore, unless a keep alive message is received that resets the age state, the age state will eventually reach a value that is greater than the age-out threshold associated with the link, and the link will be identified as having failed.

Figure 3:
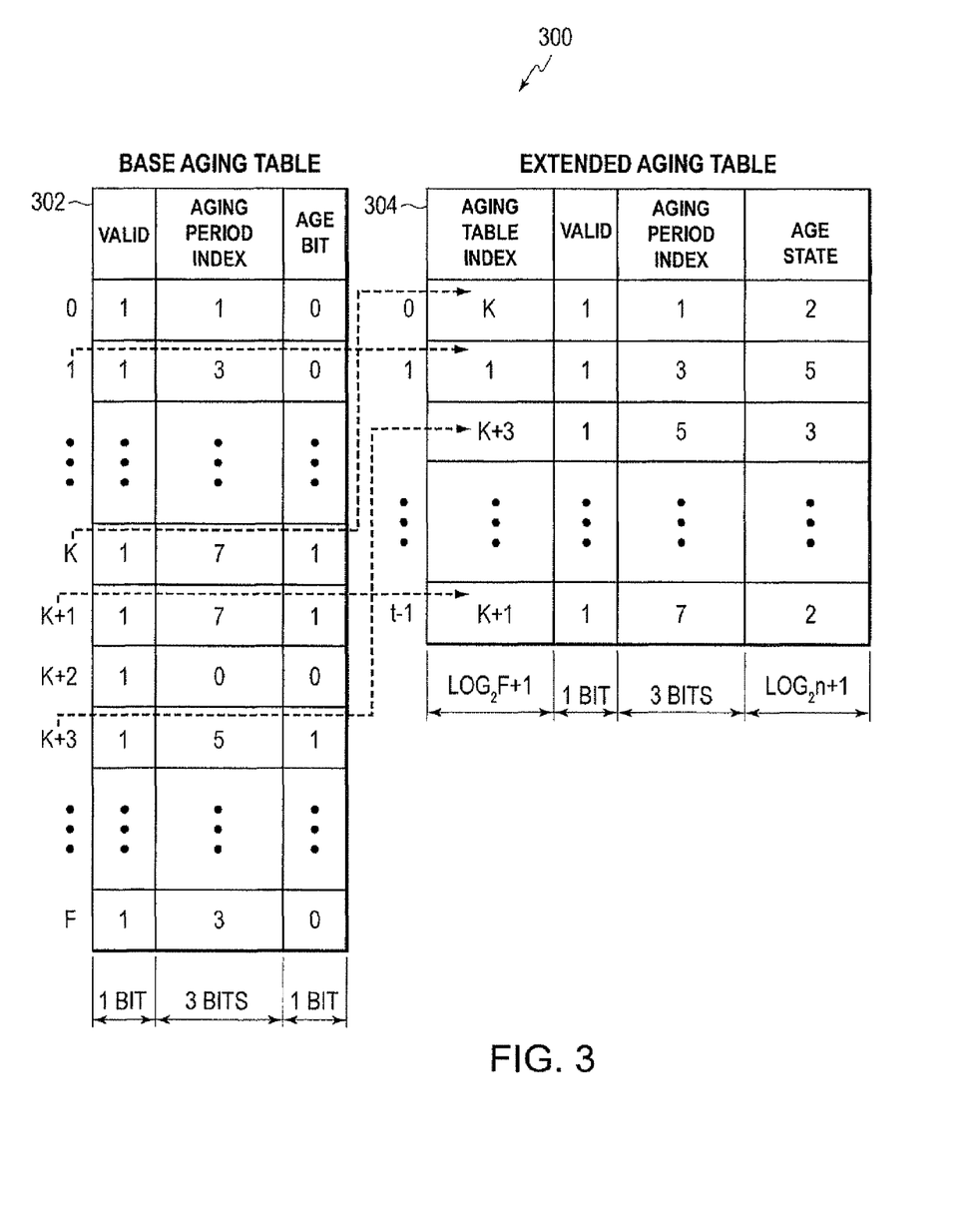
FIG. 3 is a data structure diagram of a bifurcated aging table structure that supports a described embodiment of the method of performing keep alive message processing in a packet processor.

FIG. 3 is a data structure diagram of an example bifurcated embodiment of aging table 106 that supports a described embodiment of the method of performing keep alive message processing in packet processor 100. As seen in FIG. 3, the aging table described above with respect to FIG. 2 has been bifurcated into a first table, i.e., base aging table 302, with reduced storage requirements, that is used to hold data common to all monitored links, while a second table, i.e., extended aging table 304, is used to hold additional data for only those links that are experiencing connection difficulties. By bifurcating the aging table in such a manner the same functionality of the non-bifurcated aging table is achieved with reduced memory storage requirements, as described in greater detail below.

The design of a suitable bifurcated aging table, seen in FIG. 3, is based, in part, on the observation that, under ordinary circumstances, a network experiences very few missed keep alive messages and even fewer link failures. The low rate of link failures is due in part to the reliability of network infrastructure components and the reliability of the communication protocols used in an operational environment. For example, new equipment and protocols are not deployed to an operational network unless they have been demonstrated to be reliable when properly installed and configured. Therefore, in a properly installed and configured network, link failures are relatively rare occurrences. When a large number of concurrent link failures do occur, the cause of the link failure is typically attributed to an easily identified component and, therefore, is easily repaired, e.g., a blown fuse on a network switch power supply.

The bifurcated aging table seen in FIG. 3 optimizes the aging table layout to take advantage of the above-described observation that, under ordinary circumstances, a network experiences very few missed keep alive messages and even fewer link failures. For example, in base aging table 302, the "age state" field, which has a field length of $\log_2 n+1$ bits is replaced with the field "age bit," which is only 1-bit long. Assuming that the aging table is used to monitor the link status of a large number of links, such a reduction in the record size of the base aging table results in significant memory savings. Similar to the non-bifurcated aging table 200, described above with respect to FIG. 2, each entry in base aging table 302 is associated with a numeric index that corresponds to the sequential order of the respective entry in the table. Further, each entry in base aging table 302 includes a 1-bit "valid" field and a 3-bit "aging period index." The content and use of each of these two fields is identical to the fields of the same respective names described above with respect to FIG. 2 and, therefore, will not again be described with respect to base aging table 302.

As further seen in FIG. 3, each entry in extended aging table 304 includes a 1-bit "valid" field, a 3-bit "aging period index," and an age state of length $\log_2 n+1$. The content and use of each of these fields is identical to the fields of the same respective names described above with respect to FIG. 2 and, therefore, will not again be describe with respect to extended aging table 304. Extended aging table 304 also includes an "aging table index" field of length $\log_2 F+1$, where F is the number of link entries that can be concurrently monitored by the base aging table 302. The aging table index field is populated with the sequential numeric index of a corresponding entry in the base aging table as graphically depicted, for example, in FIG. 3.

Assuming, for reasons described above, under ordinary network operating conditions no keep alive messages are missed, and no entries will be created in extended aging table 304. Therefore, the bifurcated aging table approach reduces the aging table memory requirements for performing keep alive message processing in processor 100 to the number of bits in each base aging table 302, e.g., 5-bits as described above with respect to base aging table 302, times F, where F is the number of link entries that can be concurrently monitored by the base aging table 302.

Figure 4:
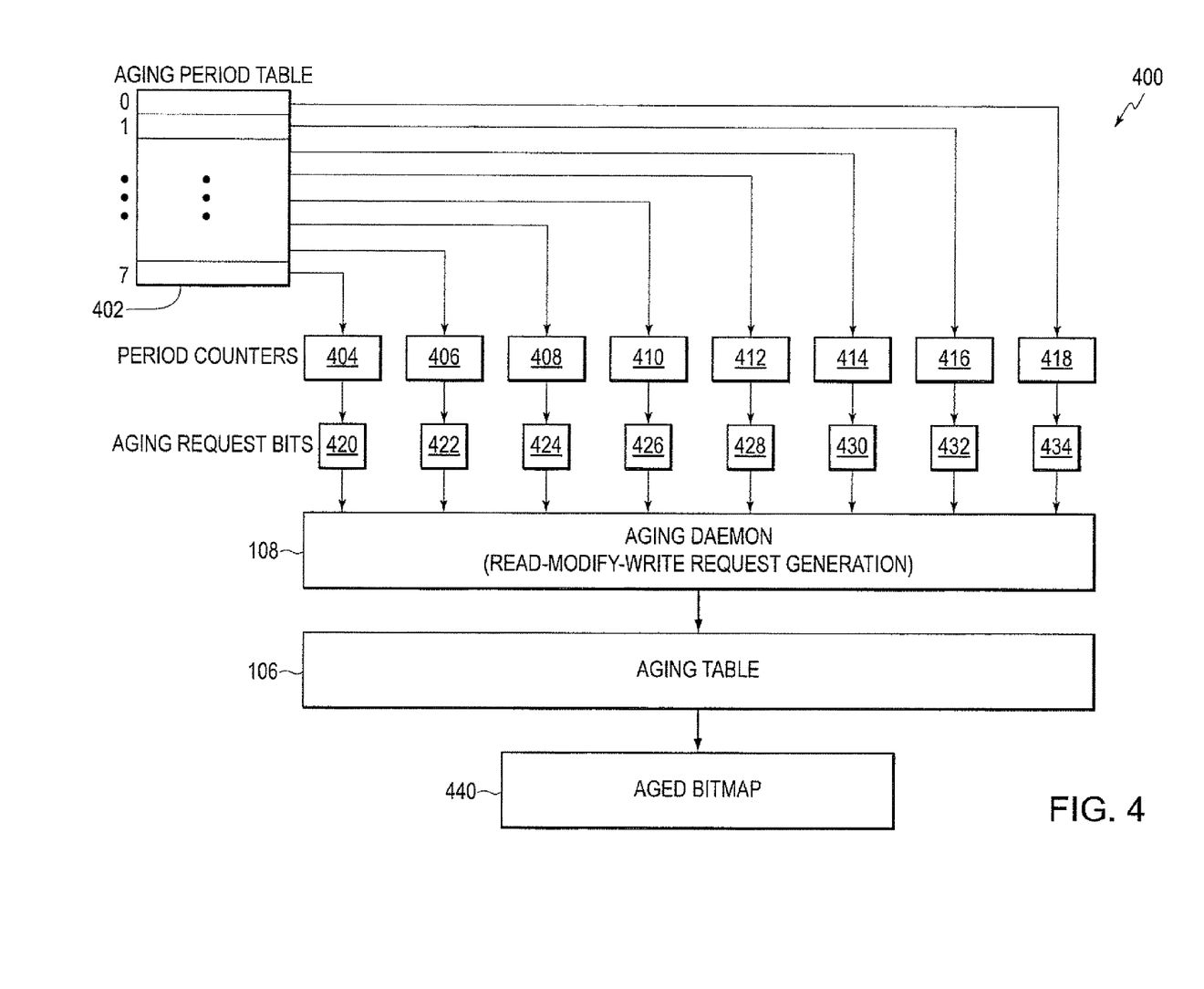
FIG. 4 is a high level schematic overview of a described embodiment of the method of performing keep alive message processing in a packet processor.

FIG. 4 is a high level schematic overview of described embodiments of the method of performing keep alive message processing in an example embodiment of the described packet processor. In the description provided below with respect to FIG. 4, it is assumed that a non-bifurcated example of the aging table, such as the non-bifurcated aging table described above with respect to FIG. 2, is used to hold link age state data. Example processes based on the use of a bifurcated aging table, such as the bifurcated aging table described above with respect to FIG. 3, is provided below with respect to FIG. 5 through FIG. 7.

As seen in FIG. 4, each of eight period counters are assigned an aging period from an example aging period table 402. For example, period counter 404 may be assigned the aging period stored in aging period table at index 0; period counter 406 may be assigned the aging period stored in aging period table at index 1; period counter 408 may be assigned the aging period stored in aging period table at index 2; period counter 410 may be assigned the aging period stored in aging period table at index 3; period counter 412 may be assigned the aging period stored in aging period table at index 4; period counter 414 may be assigned the aging period stored in aging period table at index 5; period counter 416 may be assigned the aging period stored in aging period table at index 6; and period counter 418 may be assigned the aging period stored in aging period table at index 7.

During operation, each of the period counters are initialized to zero and incremented each system clock cycle. When a period counter exceeds its assigned aging period, its corresponding aging request bit is set to a "request aging state" status that indicates that the period counter has expired. The period counter is then reset to zero and the counting process is repeated. For example, as seen in FIG. 4, aging request bit 420 is set to "request aging state" on expiration of period counter 404; aging request bit 422 is set to "request aging state" on expiration of period counter 406; aging request bit 424 is set to "request aging state" on expiration of period counter 408; aging request bit 426 is set to "request aging state" on expiration of period counter 410; aging request bit 428 is set to "request aging state" on expiration of period counter 412; aging request bit 430 is set to "request aging state" on expiration of period counter 414; aging request bit 432 is set to "request aging state" on expiration of period counter 416; and aging request bit 434 is set to "request aging state" on expiration of period counter 418.

During each clock cycle, aging daemon 108 checks the aging request bits to determine whether any of the period counters have expired. If a period counter has expired, the aging daemon 108 transitions from an "idle state" to a "request state." While in request state, the aging daemon parses through the aging table to identify and increment the age state of link entries associated with one of the timed out period counters. If any of the incremented age states exceeds the age out threshold associated with the link, the aging daemon invalidates, i.e., sets the valid bit to indicate the record is invalid and is available for reuse, the record in the aging table corresponding to the aged out link and sets a bit in aged bitmap 440 to identify the link as having aged out. Once the aging process is completed, the aging daemon may send link failed interrupt messages to the network enabled device CPU based on the links identified by aged bitmap 440 as having aged out. The aged bitmap is then reset and the above process is repeated on expiration of a next period counter.

Figure 5:
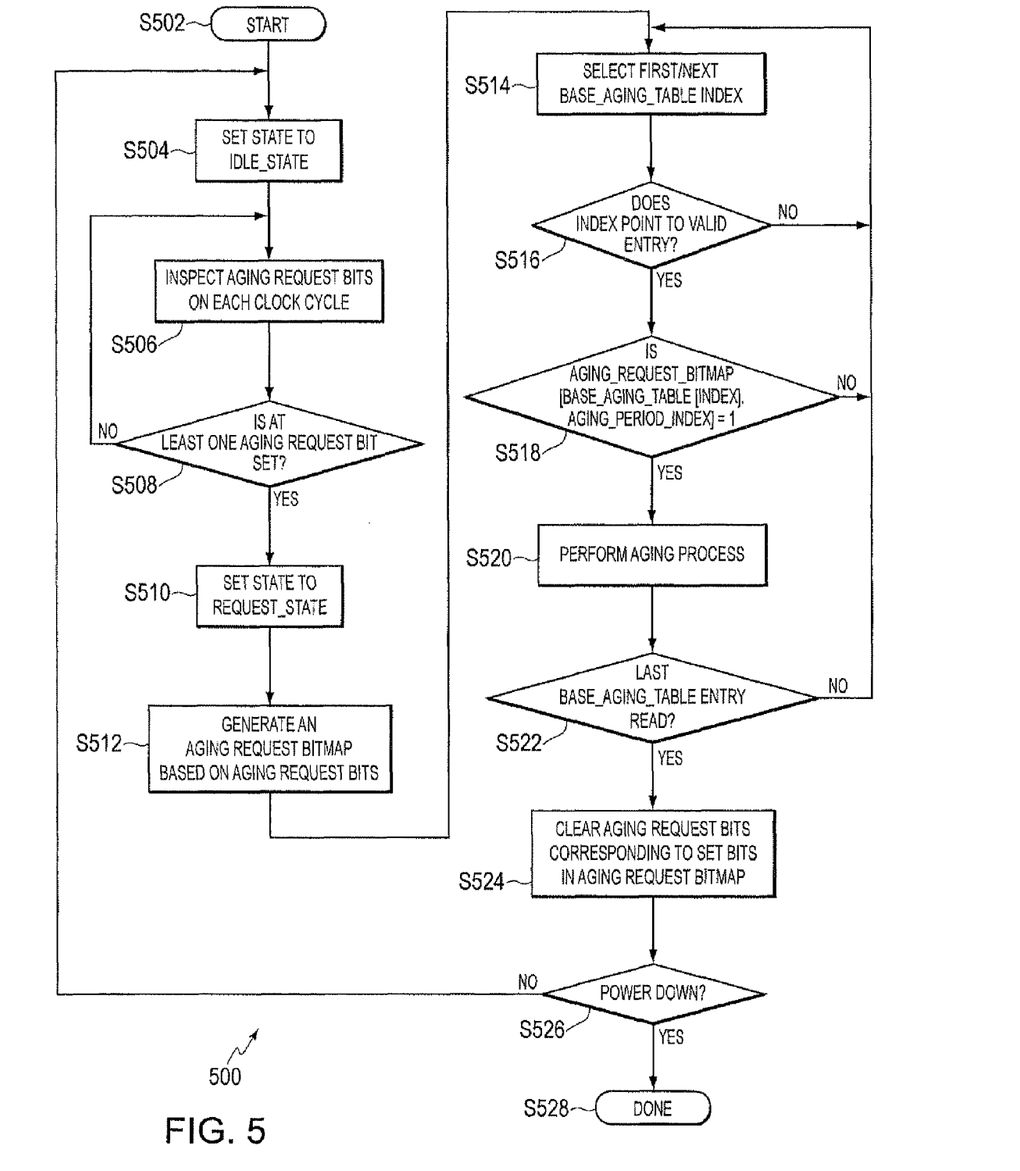
FIG. 5 is a flow-chart of an example process flow used to monitor aging period counters used to detect a failure to receive a keep alive message within a predefined period of time on each respective link supported by the packet processor.

FIG. 5 is a flow-chart of an example process flow used to monitor aging period counters that are used to detect a failure to receive a keep alive message within a predefined period of time on each respective links supported by packet processor 100. In the processes described below with respect to FIG. 5 through FIG. 7, it is assumed that a bifurcated aging table, such as the bifurcated aging table described above with respect to FIG. 3, including a base aging table 302 and an extended aging table 304. As seen in FIG. 5, operation of process 500 begins at S502 and proceeds to S504.

At S504, aging daemon 108 is initialized to idle state, and operation of the process continues at S506.

At S506, aging daemon 108 inspects aging request bits, e.g., aging request bits 420 through 434 as described above with respect to FIG. 4, to determine whether any of the aging request bits have been set to indicate that a period counter has expired, and operation of the process continues at S508.

At S508, if at least one aging request bit is set to indicate that one of the period counters has expired, operation of the process continues at S510; otherwise, operation of the process continues at S506.

At S510, aging daemon 108 changes its state to request_state, and operation of the process continues at S512.

At S512, aging daemon 108 generates an aging request bitmap that stores the current state of each aging request bit, and operation of the process continues at S514.

At S514, the aging daemon 108 selects a first/next sequential index for base aging table 302, as described above with respect to FIG. 3, and operation of the process continues at S516.

At S516, if the entry in the base aging table at the selected index is valid, e.g., if base_aging_table[index].valid=1, operation of the process continues at S518; otherwise, operation of the process continues at S514.

At S518, if the aging request bitmap indicates that the aging period associated with the current base aging table entry at the selected index has timed out, e.g., if aging_request_bitmap[base_aging_table[index].aging_period_index]=1, operation of the process continues at S520; otherwise, operation of the process continues at S514.

At S520, the aging daemon 108 performs the link aging process described below with respect to FIG. 6, to age the current link entry and, if the link has aged out, to send a link failure interrupt to the network enabled device CPU, and operation of the process continues at S522.

At S522, if the aging daemon 108 determines that the last entry in the base aging table has been read, operation of the process continues at S524; otherwise, operation of the process continues at S514.

At S524, the aging daemon 108 clears the aging request bits corresponding to set bits in the aging request bitmap generated at S512, and operation of the process continues at S526.

At S526, if the aging daemon 108 determines that the packet processor has received notification of a power down, operation of the process terminates at S528; otherwise, operation of the process continues at S504.

Figure 6:
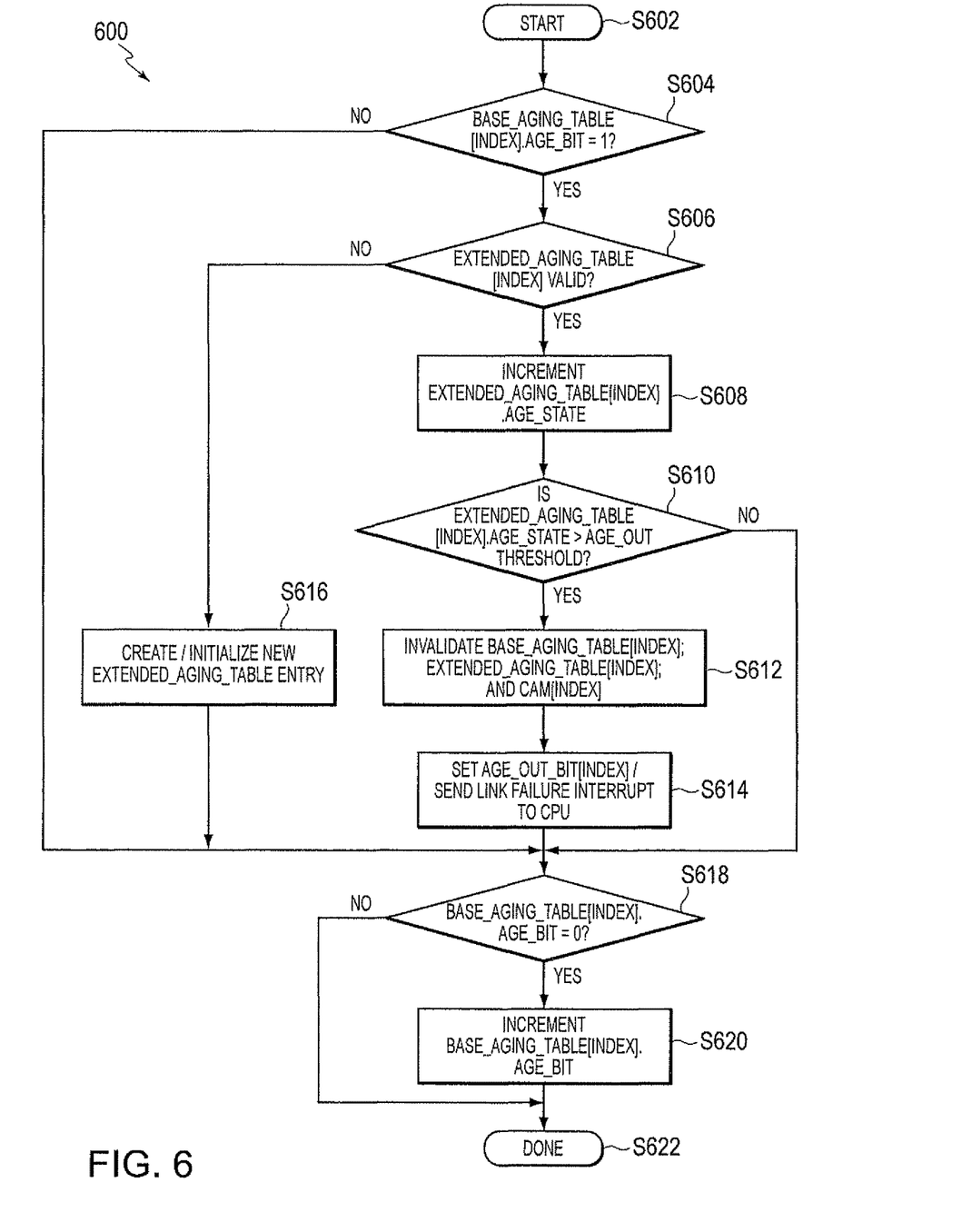
FIG. 6 is a flow-chart of an example process flow used to update the aging table to reflect a count of missed keep alive messages on each respective link supported by the packet processor and to identify failed links.

FIG. 6 is a flow-chart of an example process flow used to update the aging table to reflect a count of missed keep alive messages on each respective link supported by the packet processor 100 and to identify failed links. The process flow described below with respect to FIG. 6, may be invoked by the aging daemon 108 via, for example, the process described above with respect to FIG. 5, at S520. The aging daemon 108 may perform the link aging process described below with respect to FIG. 6, to age the current link entry and, if the link has aged out, to send a link failure interrupt to the device CPU. As seen in FIG. 6, operation of process 600 begins at S602 and proceeds to S604.

At S604, if aging daemon 108 determines that the link associated with the currently selected base aging table index failed to receive a previous keep alive message, i.e., if base_aging_table[index].age_bit=1, operation of the process continues at S606; otherwise, operation of the process continues at S618.

At S606, if aging daemon 108 determines that an entry in the extended aging table has been created for the link associated with the currently selected index, i.e., if extended_aging_table[index] exists, operation of the process continues at S608; otherwise, operation of the process continues at S616.

At S608, aging daemon 108 increments the link age state associated with the currently selected index, e.g., increments extended_aging_table[index].age_state, and operation of the process continues at S610.

At S610, if aging daemon 108 determines that the incremented age state count is greater than a predetermined age out count, operation of the process continues at S612; otherwise, operation of the process continues at S618.

At S612, aging daemon 108 invalidates entries corresponding to the currently selected index, in the CAM table, the base aging table, and the extended aging table, e.g., by setting a "valid" bit in each of the respective entries in those tables associated with the currently selected index to indicate the entry is invalid, and operation of the process continues at S614.

At S614, the aging daemon 108 sets a bit in the aged out table, described above with respect to FIG. 4, to indicate that the link has aged out, thereby causing a link failure interrupt to be sent to the CPU identifying the failed link, and operation of the process continues at S618.

Returning now to S606, if aging daemon 108 determines that an entry in the extended aging table has not been created for the link associated with the currently selected index, i.e., if extended_aging_table[index] does not exist, operation of the process continues at S616.

At S616, aging daemon 108 creates a new entry in the extended aging table for the currently selected index and populates the new entry with initial values. For example, in one example embodiment, extended_aging_table[index].aging_table_index is populated with the currently selected index, extended_aging_table[index].valid is set to "1" to indicate the entry is valid, extended_aging_table[index].aging_period_index is set to base_aging_table[index].aging_period_index, and extended_aging_table[index].age_state is set to "2." Once the entry in the extended aging table has been created and initialized, operation of the process continues at S618.

At S618, if aging daemon 108 determines based on the base aging table entry for the currently selected index that no previous keep alive messages have been missed, e.g., base_aging_table[index].age_bit=0, operation of the process continues at S620; otherwise, operation of the process terminates at S622.

At S620, aging daemon 108 updates the base aging table entry for the currently selected index to indicate that a first keep alive message has been missed, e.g., base_aging_table[index].age_bit is set to "1," and operation of the process terminates at S622.

Figure 7:
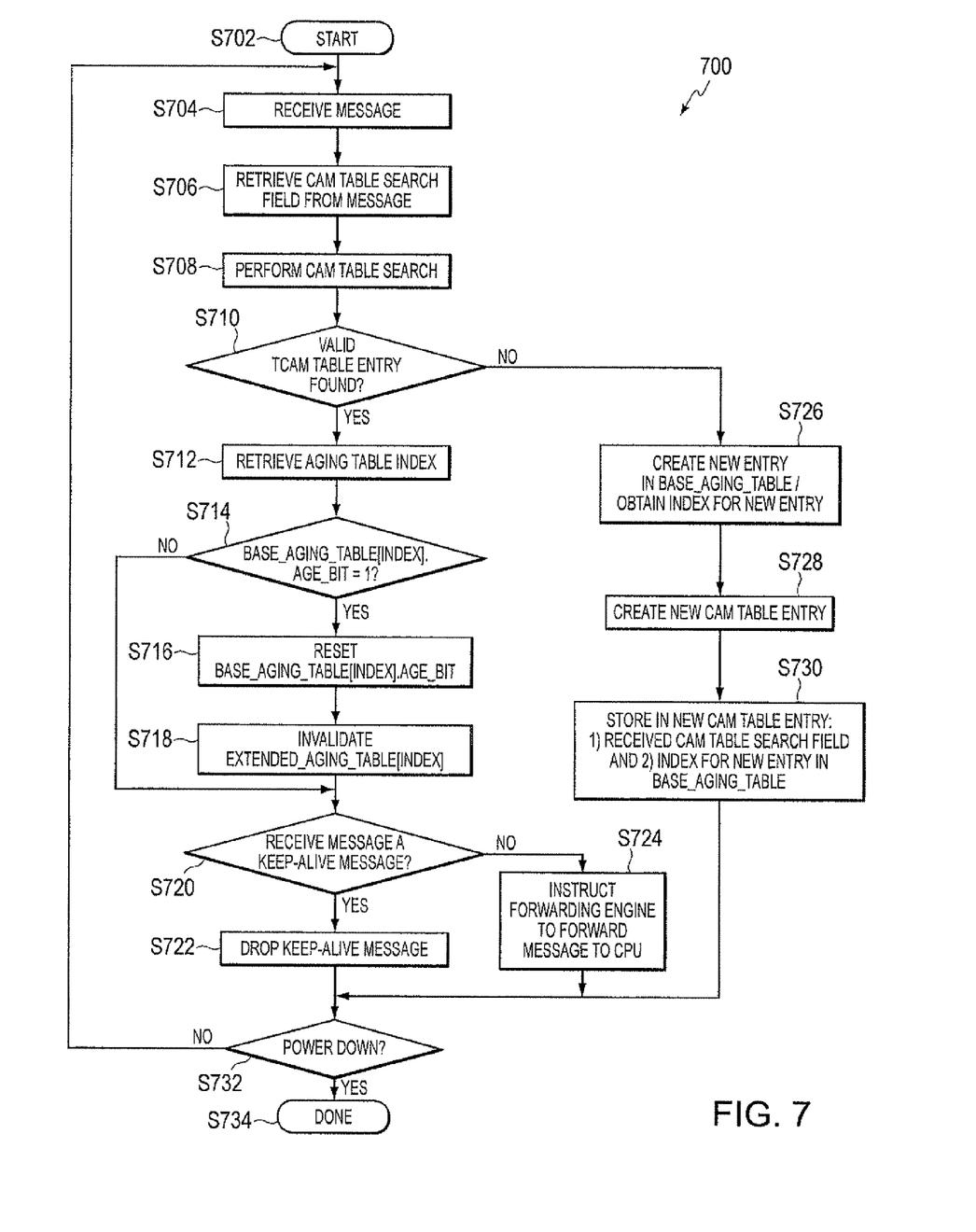
FIG. 7 is a flow-chart of an example process flow used to update the aging table to reflect receipt of a keep alive message on one of the respective links supported by the packet processor.

FIG. 7 is a flow-chart of an example process flow used to update the aging table to reflect receipt of a keep alive message on one of the respective links supported by packet processor 100. As seen in FIG. 7, operation of process 700 begins at S702 and proceeds to S704.

At S704, network ingress interface 102 receives a message from an external device via the network, and operation of the process continues at S706.

At S706, network ingress interface 102 retrieves a designated TCAM table search field from the received message, and operation of the process continues at S708.

At S708, network ingress interface 102 searches the TCAM lookup table 104 for the received search field, and operation of the process continues at S710.

At S710, if the TCAM table returns a valid TCAM table entry, operation of the process continues at S712, otherwise, operation of the process continues at S726.

At S712, network ingress interface 102 retrieves the aging table index stored in the returned TCAM table entry, and operation of the process continues at S714.

At S714, if aging daemon 108 determines, based on the aging table index received from network ingress interface 102 that the link associated with the current index failed to receive a previous keep alive message, e.g., the content of base_aging_table[index].age_bit=1, as described above with respect to FIG. 3, operation of the process continues at S716, otherwise; operation of the process continues at S720.

At S716, aging daemon 108 resets base aging table to remove any indication that the link failed to receive a previous keep alive message, e.g., base_aging_table[index].age_bit is set to "0," and operation of the process continues at S718.

At S718, aging daemon 108 invalidates any extended aging table entry associated with the current index, e.g., sets extended_aging_table[index].valid=0, and operation of the process continues at S720.

At S720, if aging daemon 108 determines that the received message is a keep alive message, operation of the process proceeds to S722; otherwise, operation of the process proceeds to S724.

At S722, aging daemon 108 drops the keep alive message, and operation of the process proceeds to S732.

Returning now to S720, if aging daemon 108 determines that the received message is not a keep alive message, operation of the process proceeds to S724.

At S724, aging daemon 108 instructs message forwarding engine 110 to forward the received message to the network enabled device CPU, and operation of the process proceeds to S732.

Returning now to S710, if the CAM table fails to return a valid CAM table entry, operation of the process continues at S726.

At S726, aging daemon 108 creates a new entry in the base aging table and obtains an index for the new entry, and operation of the process proceeds to S728.

At S728, aging daemon 108 creates a new entry in the CAM table, and operation of the process proceeds to S730.

At S730, aging daemon 108 stores the search field retrieved from the received message at S706, and the new base aging table entry index obtained at S726, in the CAM table entry created at S728, and operation of the process proceeds to S732.

At S732, if the aging daemon 108 determines that the packet processor has received notification of a power down, operation of the process terminates at S734; otherwise, operation of the process continues at S704.

It is noted that the process 700 can be suitably modified. For example, in an embodiment, at S710, when no valid TCAM table entry has been found, S726-S730 are skipped, and the packet is forwarded normally according to its target address, without doing any aging processing on it.

It is noted that in one or more of the above described embodiments, any message received on a link, in addition to the receipt of a keep alive message, may be used to reset the age state maintained in the aging table for the link on which the message is received. In such embodiments, the CPU of a network enabled device may be configured to withhold sending keep alive messages over links over which another message has recently been sent. In such a manner, proper link status maybe maintained and the amount of network traffic associated with keep alive messages may be reduced.

For purposes of explanation in the above description, numerous specific details are set forth in order to provide a thorough understanding of the described packet processor embodiments that perform keep alive message processing, and the described methods of performing keep alive message processing in a packet processor. It is noted, however, that the described embodiments may be practiced without these specific details. In other instances, various structures and devices are omitted from the figures, or are depicted in simplified and seen in block diagram form, in order to avoid obscuring the teaching features of the described embodiments.

While packet processor embodiments that perform keep alive message processing, and methods of performing keep alive message processing in a packet processor have been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:

1. A packet processor, comprising:
an aging table that includes a plurality of records corresponding to a plurality of network links supported by the packet processor, a plurality of bits as aging period index field configured to index an aging period table and an age state field of a length that is a function of a maximum number of keep alive messages, the aging period table configured to store a plurality of age periods assigned to one or more of the network links and determine a period between arrivals of the keep alive messages on the network links, each record in the aging table used to track an aging status of a corresponding network link;
a binding module that associates a received message with a record in the aging table, based on information in the received message; and
an aging daemon that scans the aging table, updates the aging status of each network link, and determines that a network link has failed when the updated aging status for the respective network link exceeds a predetermined threshold.

2. The packet processor of claim 1, wherein the binding module associates a keep alive message received on a network link with a record in the aging table corresponding to the network link.

3. The packet processor of claim 1, wherein the aging table is configured to record a count corresponding to a number of consecutive keep alive messages that are not received on a network link as the aging status of the network link.

4. The packet processor of claim 3, wherein the aging daemon is configured to increase the count in response to not receiving another keep alive message, and reset the count to zero when a keep alive measure is received.

5. The packet processor of claim 1, the aging table comprising:
a base aging table that uses a first number of bits to hack the aging status of each network link; and
an extended aging table that uses a second number of bits that is larger than the first number of bits to track an aging status of a network link on which a number of not received keep alive messages exceeds a threshold.

6. The packet processor of claim 1, further comprising:
an aging period table configured to store a plurality of allowable time intervals of two consecutive keep alive messages.

7. The packet processor of claim 1, wherein the binding module includes at least one of a CAM table and a TCAM table that determine the record in the aging table based on the information in the received message.

8. A method performed by a packet processor of a network enabled device to monitor a status of a network link between the network enabled device and one of a plurality of external devices, the method comprising:
storing a plurality of records corresponding to a plurality of network links supported by the packet processor in an aging table having a plurality of bits as aging period index field configured to index an aging period table and an age state field of a length that is a function of a maximum number of keep alive messages, the aging period table configured to store a plurality of age periods assigned to one or more of the network links and determine a period between arrivals of keep alive messages on the network links;
receiving a keep alive message from one of the plurality of external devices;
identifying a network link on which the keep alive message was received by matching an identifier in the keep alive message with one of the records for the network link in a binding table; and
clearing an aging count in the one of the records for the network link in the aging table upon receiving the keep alive message associated with the network link.

9. The method of claim 8, further comprising:
incrementing the aging count upon failing to receive a keep alive message associated with the network link in a predetermined aging interval; and
determining that the network link has failed when the incremented aging count exceeds a predetermined aging threshold.

10. The method of claim 9, wherein incrementing the aging count comprises:
scanning the aging table after expiration of each predetermined aging interval; and
incrementing the aging count for each network link associated with the expired aging interval.

11. The method of claim 9, further comprising:
maintaining a record in a base aging table for each network link associated with the network enabled device; and
creating a record in an extended aging table for each network link on which a number of not received keep alive messages exceeds a threshold.

12. The method of claim 11, further comprising:
maintaining an index value in a record in the base aging table for a corresponding record in the extended aging table.

13. The method of claim 9, further comprising:
assigning the predetermined aging interval to the network link from an aging period table that defines a plurality of predetermined aging intervals.

14. The method of claim 13, further comprising:
timing the predetermined aging interval based on a number of system clock cycles.

15. The method of claim 14, further comprising:
determining that the predetermined aging interval has expired upon determining that a number of clock cycles defined by the predetermined aging interval have transpired.

16. A network enabled device that includes a packet processor, the packet processor comprising:
an aging table that includes a plurality of records corresponding to a plurality of network links supported by the packet processor, a plurality of bits as aging period index field configured to index an aging period table and an age state field of a length that is a function of a maximum number of keep alive messages, the aging period table configured to store a plurality of age periods assigned to one or more of the network links and determine a period between arrivals of keep alive messages on the network links, each record in the aging table used to track an aging status of a corresponding network link;
a binding module that associates a received message with a record in the aging table, based on information in the received message; and
an aging daemon that scans the aging table, updates the aging status of each network link, and determines that a network link has failed when the updated aging status for the respective network link exceeds a predetermined threshold.

17. The network enabled device of claim 16, the aging table of the packet processor comprising:
a base aging table that uses a first number of bits to track the aging status of each network link; and
an extended aging table that uses a second number of bits that is larger than the first number of bits to track an aging status of a network link on which a number of not received keep alive messages exceeds a threshold.

18. The network enabled device of claim 16, wherein the binding module identifies a record in the aging table in association with the received message based on a header of the received message.

19. The network enabled device of claim 16, wherein the binding module identifies a record in the aging table in association with the received message based on at least one of a MAC address included in the received message and a VLAN identifier included in the received message.

20. The network enabled device of claim 16, wherein the binding module includes at least of one of a CAM table and a TCAM table to determine the record in the aging table based on the information in the received message.

* * * * *